(12) United States Patent
Yamane et al.

(10) Patent No.: US 7,050,230 B2
(45) Date of Patent: May 23, 2006

(54) OPTICAL SWITCH DEVICE

(75) Inventors: Takashi Yamane, Kawasaki (JP); Toshiya Kishida, Kawasaki (JP); Manabu Komiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/047,743

(22) Filed: Feb. 2, 2005

(65) Prior Publication Data

US 2005/0128585 A1    Jun. 16, 2005

Related U.S. Application Data

(63) Continuation of application No. PCT/JP03/01373, filed on Feb. 10, 2003.

(51) Int. Cl.
   *G02F 1/00* (2006.01)
   *G02B 5/30* (2006.01)

(52) U.S. Cl. .................. 359/484; 359/496; 359/497

(58) Field of Classification Search ............... 359/484, 359/496, 497; 349/496, 497
   See application file for complete search history.

(56) References Cited

U.S. PATENT DOCUMENTS

| | | | |
|---|---|---|---|
| 4,516,837 A | 5/1985 | Soref et al. | 349/196 |
| 5,414,540 A | 5/1995 | Patel et al. | 349/196 |
| 5,724,165 A * | 3/1998 | Wu | 398/55 |
| 5,946,116 A | 8/1999 | Wu et al. | 398/55 |
| 6,097,518 A | 8/2000 | Wu et al. | 398/1 |
| 6,275,312 B1 * | 8/2001 | Derks et al. | 398/9 |
| 6,360,034 B1 * | 3/2002 | Chang | 385/18 |
| 6,360,037 B1 * | 3/2002 | Riza | 385/22 |
| 6,807,329 B1 * | 10/2004 | Zalevsky et al. | 385/16 |
| 2002/0009257 A1 | 1/2002 | Bouevitch et al. | 385/24 |

FOREIGN PATENT DOCUMENTS

| | | |
|---|---|---|
| JP | 55-103518 | 8/1980 |
| JP | 61-151612 A  * | 7/1986 |
| JP | 05034714 | 2/1993 |
| JP | 05113582 | 5/1993 |
| JP | 05204000 | 8/1993 |
| JP | 11-218752 | 8/1999 |
| JP | 2000-206576 | 7/2000 |

* cited by examiner

*Primary Examiner*—Drew A. Dunn
*Assistant Examiner*—Lee Fineman
(74) *Attorney, Agent, or Firm*—Staas & Halsey LLP

(57) ABSTRACT

Light incident on an input optical fiber is separated into p-polarized light and s-polarized light by a birefringent crystal. A voltage to be applied to a liquid crystal element having electrodes associated with the ray axes of the polarized light waves is controlled in order to convert the p-polarized light into s-polarized so that both the polarized light waves will be s-polarized light. A polarized-wave separation film transmits p-polarized light and reflects s-polarized light. When both the polarized light waves propagated through the liquid crystal element are s-polarized light, the light reflected from the polarized-wave separation film is reflected from a total-reflection film, and reflected again from the polarized-wave separation film. The resultant light falls on the birefringent crystal again via the liquid crystal element, and is restored to non-polarized light by the birefringent crystal. The non-polarized light then falls on a first output optical fiber.

6 Claims, 6 Drawing Sheets

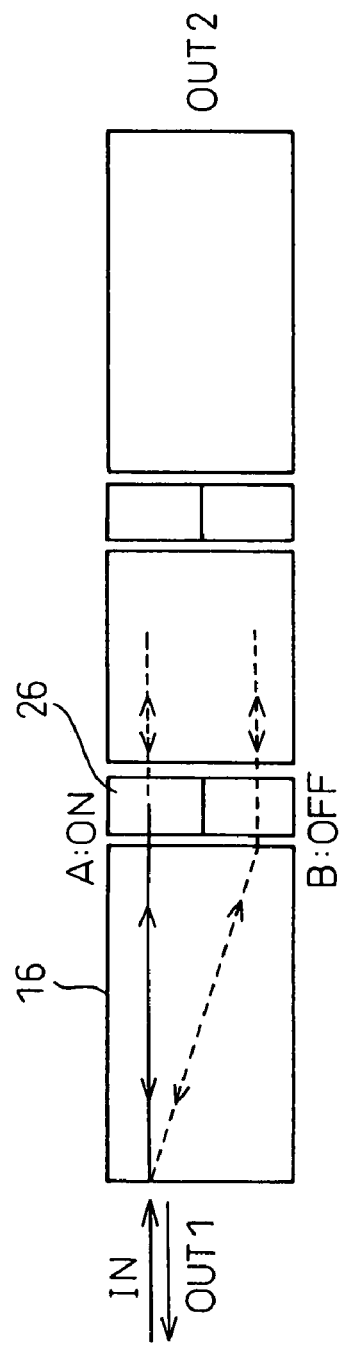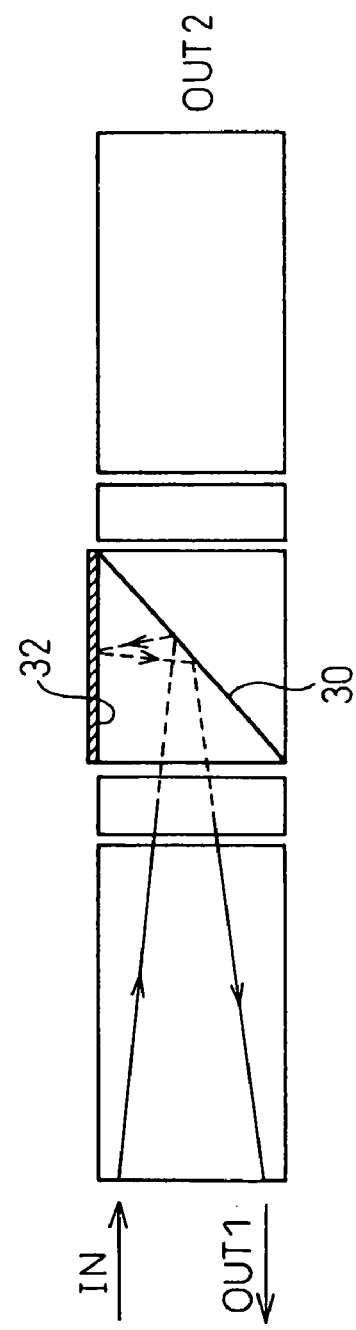

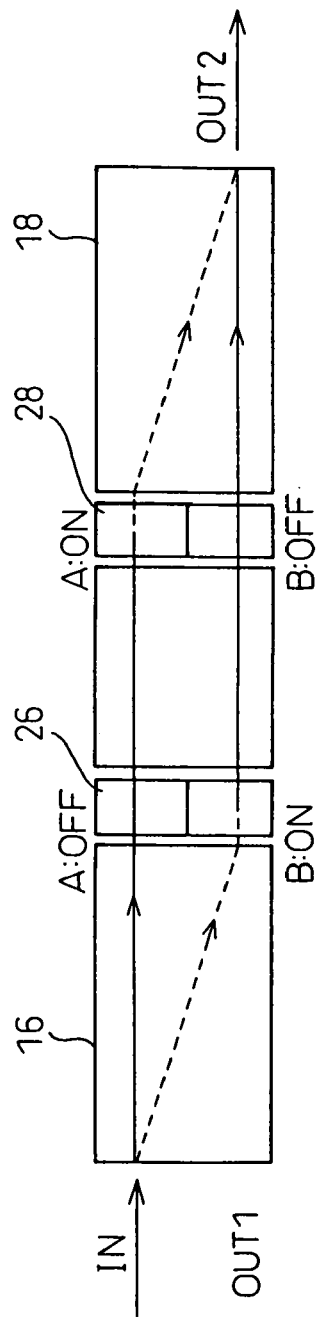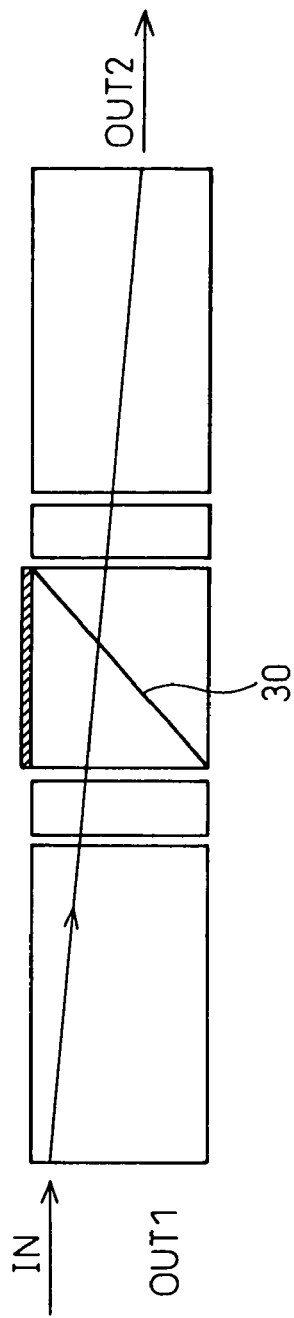

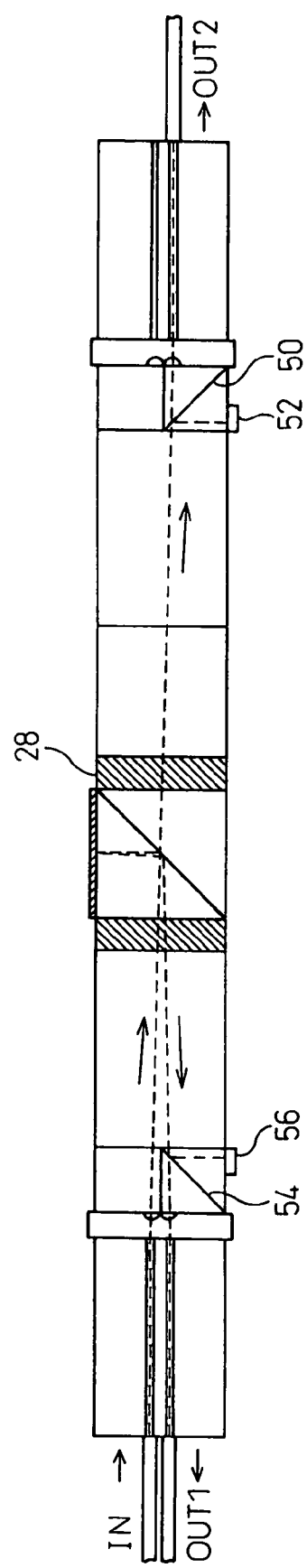

OPTICAL SWITCH DEVICE

CROSS-REFERENCE TO RELATED APPLICATION

This application is a continuation of, and claims priority from, International PCT Application No. PCT/JP03/01373, filed on Feb. 10, 2003, the contents being incorporated herein by reference.

BACKGROUND OF THE INVENTION

1. Field of the Invention

The present invention relates to an optical switch device.

2. Description of the Related Art

In recent years, optical communication channel capacities have been urgently required to be increased along with an increase in the traffic on the Internet. An approach to the increase in a communication channel capacity is to increase a bit rate or adopt wavelength division multiplexing (WDM). Realization of the optical devices constituting such a system has been awaited.

WDM is a technique for transmitting numerous signals, which have different wavelengths, over one optical fiber, and increasing the data-carrying capacity of the optical fiber by carrying information at each wavelength. Almost all WDM systems employ an optical switch, in order to perform port switching in a redundant construction or to perform port switching for monitoring purposes, etc.

Moreover, when optical signals are transmitted over an optical fiber, a propagation loss differs from signal to signal, that is, from wavelength to wavelength. After the optical signals are transmitted over a long distance, the signal levels become different from wavelength to wavelength. This phenomenon becomes more obvious in a case where a branching device or an erbium-doped fiber (EDF) amplifier is disposed on a transmission line.

To this end, before optical signals are transmitted or received, the levels of the signals having different wavelengths must be made equal. As a solution, variable attenuator devices that control the level of individual wavelengths and optical switches are used to control optical output to be transmitted or received so that intensity of the optical output will be made equal for every wavelength.

Assuming that WDM is adopted, an optical signal level must be controlled for each wavelength (channel). Therefore, attenuators and optical switches that can vary an optical signal level for individual channels must be disposed. At present, individual devices are incorporated in a system, and the system is therefore large in size and expensive. In efforts to design the system compactly, a technique employing a waveguide (planar lightwave circuit (PLC)) has been developed but it is unsatisfactory in terms of cost and size.

Patent Document 1: Japanese Unexamined Patent Application Publication No. 5-113582 (FIG. 3(a))

Patent Document 2: Japanese Patent No. 3008964

Patent Document 3: Japanese Unexamined Patent Application Publication No. 5-204000

SUMMARY OF THE INVENTION

Accordingly, an object of the present invention is to propose, as a means for solving the foregoing problems, a device having a small size that can switch an optical path and can vary an optical output.

According to the present invention, there is provided an optical switch device comprising: a polarization control unit capable of being switched, according to a control signal, between a first state in which the polarization control unit converts non-polarized light incident on a first surface thereof into light polarized in a first direction and converts light polarized in the first direction and incident on a second surface thereof opposed to the first surface thereof into non-polarized light, and a second state in which the polarization control unit converts non-polarized light incident on the first surface thereof into light polarized in a second direction; a polarized-light separation unit that reflects the light polarized in the first direction and propagated through the polarization control unit, and transmits the light polarized in the second direction; and a reflection unit that reflects light reflected from the polarized-light separation unit so as to route the light to the polarized-light separation unit again. The polarized light separation unit and reflection unit are disposed so that the light polarized in the first direction, reflected from the reflection unit, and reflected again from the polarized-light separation unit will fall on the second surface of the polarization control unit.

The optical switch device further comprises a polarized state restoration unit that restores the light, which is polarized in the second direction and transmitted by the polarized-light separation unit, to non-polarized light.

The polarization control unit comprises: a first birefringent crystal that separates, for example, non-polarized light into light polarized in the first direction and light polarized in the second direction; and a first liquid crystal element that can be switched according to the control signal between a first state in which the liquid crystal element turns the direction of polarization of the light polarized in the second direction and propagated through the birefringent crystal so as to produce light polarized in the first direction, and a second state in which the liquid crystal element turns the direction of polarization of the light polarized in the first direction and propagated through the birefringent crystal so as to produce light polarized in the second direction.

The polarized-light separation unit includes a polarized-light separation film coated over the first surface of a prism, and the reflection unit includes a reflection film coated over the second surface of the prism.

The polarized state restoration unit includes: a second liquid crystal element that converts part of the light polarized in the second direction and transmitted by the polarized-light separation unit, which stems from the light polarized in the second direction and propagated through the first birefringent crystal, into light polarized in the first direction; and a second birefringent crystal that synthesizes the remaining part of the light polarized in the second direction and transmitted by the polarized-light separation unit with the light polarized in the first direction and converted by the liquid crystal element so as to produce non-polarized light.

The polarized state restoration unit includes: a first half-wave plate that converts part of the light polarized in the second direction and transmitted by the polarized-light separation unit, which stems from the light polarized in the second direction and propagated through the first birefringent crystal, into light polarized in the first direction; and a second birefringent crystal that synthesizes the remaining part of the light polarized in the second direction and transmitted by the polarized-light separation unit with the light polarized in the first direction and converted by the half-wave plate so as to produce non-polarized light.

BRIEF DESCRIPTION OF THE DRAWINGS

FIG. 5 is a plan view illustratively showing light paths traced by light when an output port OUT1 is selected;

FIG. 6 is a side view of the light paths shown in FIG. 5;

FIG. 7 is a plan view illustratively showing light paths traced by light when an output port OUT2 is selected;

FIG. 8 is a side view of the light paths shown in FIG. 7;

FIG. 10 is a side view of an optical switch device including a level monitor.

DESCRIPTION OF THE PREFERRED EMBODIMENTS

Figure 1:
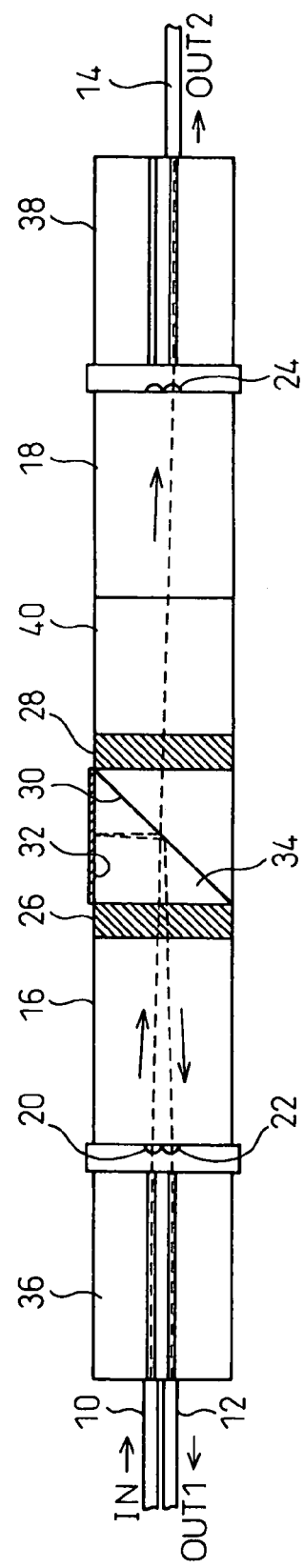
FIG. 1 is a side view of an embodiment of an optical switch device in accordance with the present invention.
Figure 2:
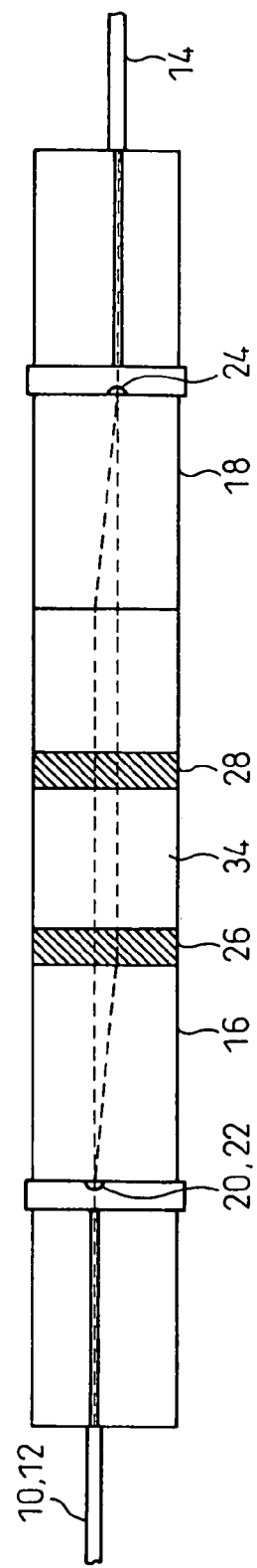
FIG. 2 is a plan view of the optical switch device shown in FIG. 1.

FIG. 1 (side view) and FIG. 2 (plan view) show an optical output variable switch device in accordance with an embodiment of the present invention. The device comprises optical fibers 10, 12, and 14, birefringent crystal plates 16 and 18, lenses 20, 22, and 24, liquid crystals 26 and 28, and a prism 34 having surfaces thereof coated with a polarized-wave separation film 30 and a total reflection film 32. The device is very small. Fiber blocks 36 and 38 hold core wires of the optical fibers, and a transparent medium 40 is glass or the like having the same size as the prism 34. The device is, as a whole, a 1×2 switch that has one input coupled to one of the two fibers 10 and 12 and two output ports one of which is a port OUT1 coupled to the other of the two fibers 10 and 12 and the other of which is a port OUT2 opposite to the port OUT1 in a direction of transmission. Either of the ports OUT1 and OUT2 can be selected by controlling a voltage to be applied to the liquid crystal 26. Moreover, an optical output to be transmitted via the port OUT2 can be varied by controlling a voltage to be applied to the liquid crystal 28.

Figure 3:
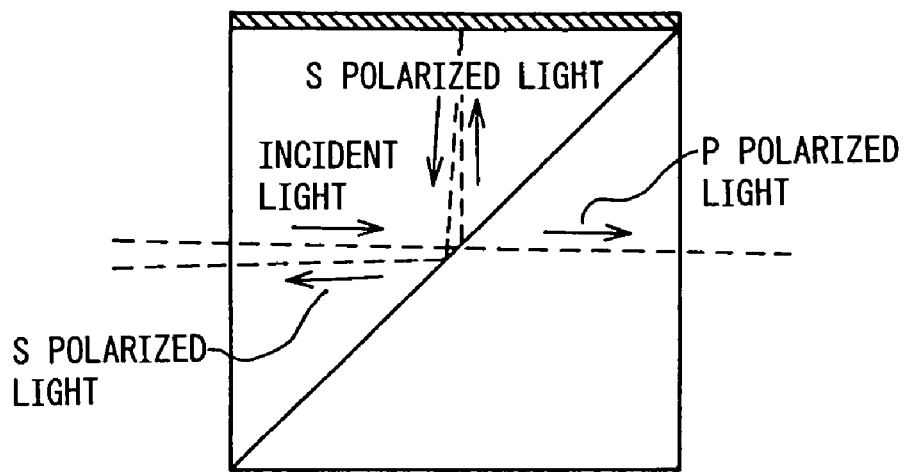
FIG. 3 is diagram showing a prism 34.
Figure 4:
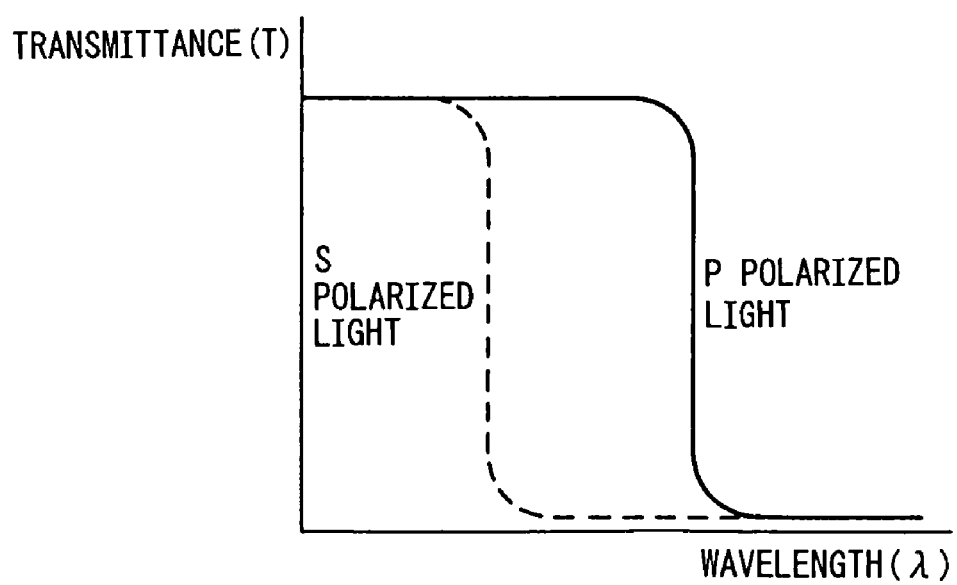
FIG. 4 is a graph indicating the characteristic of a polarized-wave separation film 30.

The principles of the present embodiment will be described below. Light incident from the one 10 of the two core wires of the fiber passes through the lens 20 and falls on the birefringent crystal 16. The light incident on the birefringent crystal 16 is separated into ordinary light (p-polarized light) and extraordinary light (s-polarized light), and propagated through the crystal. The liquid crystal 26 having electrodes associated with the ray axes of the p-polarized light and s-polarized light respectively is located at an exit of the birefringent crystal 16. The cubic prism 34 (see FIG. 3) having surfaces thereof coated with the polarized-wave separation film 30 and total-reflection film 32 respectively is located at the rear end of the liquid crystal 26. Thus, either of reflection and transmission can be selected by bringing the liquid crystal 26 to the on or the off state. The polarized-wave separation film 30 has the characteristic thereof indicated with a characteristic curve shown in FIG. 4. The reflection film 32 has an ordinary characteristic of total reflection. Incident light is separated into ordinary light (p-polarized light) and extraordinary light (s-polarized light) by the birefringent crystal 16, and falls on the liquid crystal element 26 immediately after passing through the birefringent crystal 16. The light whose direction of polarization is controlled by the liquid crystal element 26 falls on the polarized-wave separation film 30. The s-polarized light is reflected upwards, reflected from the total-reflection film 32 located upwards, and returned to the direction of the original ray axis. The p-polarized light is transmitted by the polarized-wave separation film 30. At this time, when a voltage to be applied to the electrode of the liquid crystal element 26 associated with the p-polarized light is set to the on or off state, the direction of polarization of the ordinary light (p-polarized light) having passed through the birefringent crystal 16 is turned 90° or is not turned. Thus, reflection or transmission from or by the polarized-wave separation film 30 can be selected. Furthermore, the liquid crystal element 28 is located at the distal end of the prism 34 in order to control the direction of polarization of light incident on the next birefringent crystal 18. Thus, light can be transmitted in the direction of the port OUT2. By the way, the same applies to the extraordinary light (s-polarized light). The on or off state of the electrode of the liquid crystal element 26 associated with the s-polarized light is controlled in order to change light incident on the polarized-wave separation film 30. Thus, transmission or reflection is selected. For transmission, the liquid crystal 28 located at the rear end of the prism 34 routes light to the port OUT2.

To be more specific, when the port OUT1 is selected as an output port, the electrode (A) of the liquid crystal 26 associated with the ray axis of the p-polarized light (solid line) propagated through the birefringent crystal 16 is, as illustrated in FIG. 5 (plan view) and FIG. 6 (side view), brought to the on state, and the electrode (B) thereof associated with the ray axis of the s-polarized light (dashed line) is brought to the off state. Consequently, the p-polarized light propagated through the birefringent crystal 16 is changed to s-polarized light at the time of leaving the liquid crystal. Consequently, all the light waves are s-polarized light waves and reflected from the polarized-light separation film 30. The s-polarized light reflected from the polarized-light separation film 30 is reflected from the total-reflection film 32, reflected again from the polarized-light separation film 30, and thus routed again to the liquid crystal 26. The s-polarized light reflected from the polarized-light separation film 30 (s-polarized light into which p-polarized light propagated through the birefringent crystal 16 is converted) is changed to p-polarized light at the time of leaving the electrode A of the liquid crystal 26. The other polarized light (s-polarized light propagated through the birefringent crystal 16) falls on the electrode B (off state) and enters the birefringent crystal 16 as it is. The s-polarized light is then coupled with the p-polarized light, and transmitted through the port OUT1.

When the port OUT2 is selected as an output port, the foregoing procedure is reversed as illustrated in FIG. 7 (plan view) and FIG. 8 (side view). Namely, the electrode A is brought to the off state and the electrode B is brought to the on state. Consequently, s-polarized light is changed into p-polarized light, and transmitted by the polarized-light separation film 30. When the electrode A of the liquid crystal 28 is brought to the on state and the electrode B thereof is brought to the off state, part of the transmitted p-polarized light (p-polarized light propagated through the birefringent crystal 16) is changed to s-polarized light and coupled with the remaining p-polarized light through the birefringent crystal 18 (p-polarized light into which s-polarized light propagated through the birefringent crystal 16 is converted). The resultant light is transmitted via the port OUT2.

Figure 9:
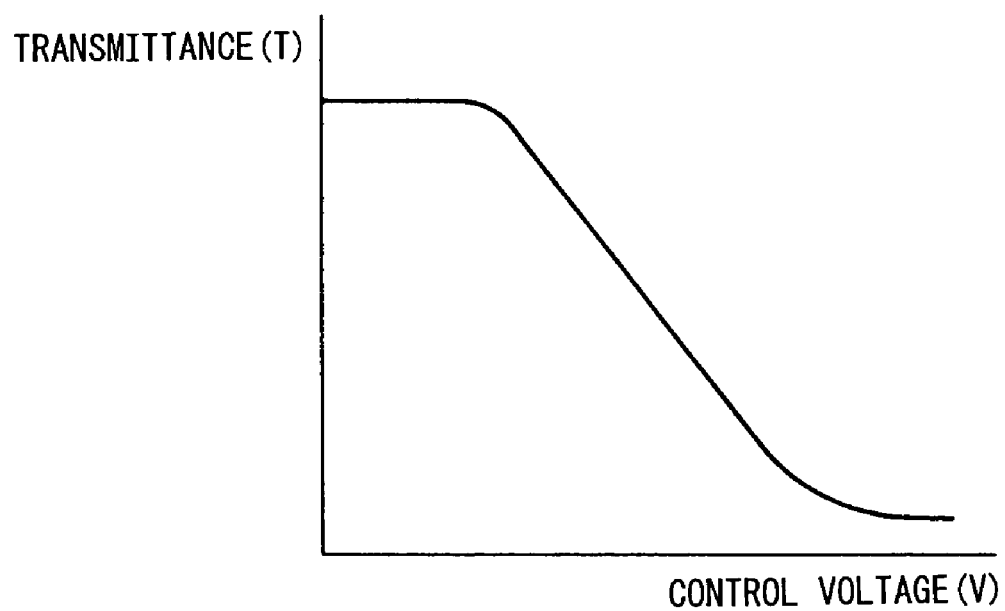
FIG. 9 is a graph for explaining variation of an optical output performed by controlling a voltage to be applied to a liquid crystal element 28.

When the voltage to be applied to the liquid crystal element 28 is finely controlled, an optical output transmitted via the port OUT2 can be varied. Specifically, a light component different from a light component that is coupled to the port OUT2 via the birefringent crystal located behind the liquid crystal 28 is produced. The light component is not coupled to the port OUT2 but is lost. Namely, the optical output can be finely varied by finely controlling the voltage to be applied to the liquid crystal element 28 (see FIG. 9).

As mentioned above, an optical output variable switch device can be realized compactly and inexpensively.

The optical fibers 10 and 12 are realized with, for example, a fiber assembly comprising two core wires or by juxtaposing two fiber assembly each comprising one core wire. The spacing between the optical fibers 10 and 12 is, for example, approximately 300 µm. The lenses 20, 22, and 24 are collimator lenses, and have optical axes thereof extended from the centers thereof towards the peripheries thereof, so that the lenses will constitute a turnaround reflection optical system. The turnaround reflection optical system causes light incident on the optical fiber 10 and reflected from the films 30 and 32 to fall on the optical fiber 12. The reflective optical axes are, as shown in FIG. 1 and FIG. 2, turned around at the rear end of the prism 34 (interface with the liquid crystal 28). The birefringent crystal 16 is realized with, for example, a rutile (a parallelepiped whose base is 1 mm-square and whose length is 3 mm, pitch for separation: 300 µm). The birefringent crystal 16 is fixed to each of the lens 20 and liquid crystal 26 using an optical adhesive. The optical elements may be assembled on a member serving as a base in order to form an optical system. Electrodes each of which is, for example, approximately 250 µm-square are formed on the liquid crystal 26 in order to form ports through which p-polarized light and s-polarized light are propagated. The prism 34 having the polarized-wave separation film 30 and total-reflection film 32 coated thereon is formed with, for example, quartz or glass, and the films are formed with a dielectric multilayer film or a metallic film. As for the size of the prism 34, the prism 34 has a 2 mm-square base. The liquid crystal 28 located on the port OUT2 side is formed with the same material as the aforesaid liquid crystal 26. The birefringent crystal 18 located behind the liquid crystal 28 is also formed with a rutile (a parallelepiped whose base is 1 mm-square and whose length is 3 mm, pitch for separation: 300 µm). The output optical fiber 14 is formed with one coated optical fiber, and the lens 24 is formed with one lens. For example, a lens and a fiber may be integrated into one unit.

The foregoing optical elements are secured using an optical adhesive, and all of them are stored and secured in a pre-molded package. This results in an optical switch device (1×2) that is approximately 5 mm wide, 20 mm long, and 3 mm high and that can vary an optical output.

A level monitor that monitors the signal level of a varied optical output may be included. A photodiode is used to realize the level monitor. A feedback circuit that uses an output current of the photodiode, which flows out of the optical switch device, controls a voltage to be applied to a liquid crystal. As shown in FIG. 10, a monitoring technique is such that a coupler film 50 is formed in front of the port OUT2 in order to route light to the photodiode 52. Herein, a back incidence photodiode is adopted as the photodiode 52 in efforts to design the optical switch device compactly. The bottom of the coupler film 50 is bonded directly to a coupler prism using an optical adhesive. Furthermore, FIG. 10 shows a coupler film 54 and a photodiode 56 that are used to monitor the level of an optical signal to be transmitted via the port OUT1.

If an optical output to be transmitted via the port OUT2 is not variable, a half-wave plate may be substituted for the liquid crystal 28 in order to handle light to be transmitted via the port A.

What is claimed is:

1. An optical switch device comprising:
    a polarization control unit capable of being switched according to a control signal between a first state in which the polarization control unit converts non-polarized light incident on a first surface thereof into light polarized in a first direction, and converts light polarized in the first direction and incident on a second surface thereof opposite to the first surface thereof into non-polarized light, and a second state in which the polarization control unit converts non-polarized light incident on the first surface thereof into light polarized in a second direction;
    a polarized-light separation unit that reflects the light polarized in the first direction and propagated through the polarization control unit and that transmits the light polarized in the second direction; and
    a reflection unit that only once reflects light reflected from the polarized-light separation unit so as to route the light to the polarized-light separation unit again, wherein:
    the polarized-light separation unit and reflection unit are disposed so that the light polarized in the first direction, reflected from the reflection unit, and reflected again from the polarized-light separation unit will fall on the second surface of the polarization control unit.

2. The optical switch device according to claim 1, further comprising a polarized state restoration unit that restores the light polarized in the second direction and transmitted by the polarized-light separation unit to non-polarized light.

3. The optical switch device according to claim 2, wherein the polarization control unit comprises:
    a first birefringent crystal that separates non-polarized light into light polarized in the first direction and light polarized in the second direction; and
    a first liquid crystal element capable of being switched according to the control signal between a first state in which the first liquid crystal element turns the direction of polarization of the light polarized in the second direction and propagated through the birefringent crystal so as to produce light polarized in the first direction, and a second state in which the first liquid crystal element turns the direction of polarization of the light polarized in the first direction and propagated through the birefringent crystal so as to produce light polarized in the second direction.

4. The optical switch device according to claim 3, wherein the polarized state restoration unit comprises:
    a second liquid crystal element that converts part of the light polarized in the second direction and propagated through the polarized-light separation unit, which stems from the light polarized in the second direction and propagated through the first birefringent crystal, into light polarized in the first direction; and
    a second birefringent crystal that couples the remaining part of the light polarized in the second direction and transmitted by the polarized-light separation unit with the light polarized in the first direction and converted by the liquid crystal element so as to produce non-polarized light.

5. An optical switch device comprising:
    a polarization control unit capable of being switched according to a control signal between a first state in which the polarization control unit converts non-polarized light incident on a first surface thereof into light polarized in a first direction, and converts light polarized in the first direction and incident on a second surface thereof opposite to the first surface thereof into non-polarized light, and a second state in which the polarization control unit converts non-polarized light incident on the first surface thereof into light polarized in a second direction;

a polarized-light separation unit that reflects the light polarized in the first direction and propagated through the polarization control unit and that transmits the light polarized in the second direction;

a reflection unit that reflects light reflected from the polarized-light separation unit so as to route the light to the polarized-light separation unit again, wherein:

the polarized-light separation unit and reflection unit are disposed so that the light polarized in the first direction, reflected from the reflection unit, and reflected again from the polarized-light separation unit will fall on the second surface of the polarization control unit; and a polarized state restoration unit that restores the light polarized in the second direction and transmitted by the polarized-light separation unit to non-polarized light wherein the polarization control unit comprises:
　a first birefringent crystal that separates non-polarized light into light polarized in the first direction and light polarized in the second direction, and
　a first liquid crystal element capable of being switched according to the control signal between a first state in which the first liquid crystal element turns the direction of polarization of the light polarized in the second direction and propagated through the birefringent crystal so as to produce light polarized in the first direction, and a second state in which the first liquid crystal element turns the direction of polarization of the light polarized in the first direction and propagated through the birefringent crystal so as to produce light polarized in the second direction; and wherein the polarized-light separation unit includes a polarized-light separation film coated over the first surface of a prism, and the reflection unit includes a reflection film coated over the second surface of the prism.

6. An optical switch device comprising:

a polarization control unit capable of being switched according to a control signal between a first state in which the polarization control unit converts non-polarized light incident on a first surface thereof into light polarized in a first direction, and converts light polarized in the first direction and incident on a second surface thereof opposite to the first surface thereof into non-polarized light, and a second state in which the polarization control unit converts non-polarized light incident on the first surface thereof into light polarized in a second direction;

a polarized-light separation unit that reflects the light polarized in the first direction and propagated through the polarization control unit and that transmits the light polarized in the second direction;

a reflection unit that reflects light reflected from the polarized-light separation unit so as to route the light to the polarized-light separation unit again, wherein:

the polarized-light separation unit and reflection unit are disposed so that the light polarized in the first direction, reflected from the reflection unit, and reflected again from the polarized-light separation unit will fall on the second surface of the polarization control unit; and a polarized state restoration unit that restores the light polarized in the second direction and transmitted by the polarized-light separation unit to non-polarized light wherein the polarization control unit comprises:
　a first birefringent crystal that separates non-polarized light into light polarized in the first direction and light polarized in the second direction, and
　a first liquid crystal element capable of being switched according to the control signal between a first state in which the first liquid crystal element turns the direction of polarization of the light polarized in the second direction and propagated through the birefringent crystal so as to produce light polarized in the first direction, and a second state in which the first liquid crystal element turns the direction of polarization of the light polarized in the first direction and propagated through the birefringent crystal so as to produce light polarized in the second direction, and wherein the polarized state restoration unit comprises:

a half-wave plate that converts part of light polarized in the second direction and transmitted by the polarized-light separation unit, which stems from the light polarized in the second direction and propagated through the first birefringent crystal, into light polarized in the first direction; and a second birefringent crystal that couples the remaining part of the light polarized in the second direction and transmitted by the polarized-light separation unit with the light polarized in the first direction and converted by the half-wave plate so as to produce non-polarized light.

* * * * *